T. L. GREEN.
SHEETING AND BAR MACHINE.
APPLICATION FILED FEB. 20, 1909.
1,172,521. Patented Feb. 22, 1916.
5 SHEETS—SHEET 1.
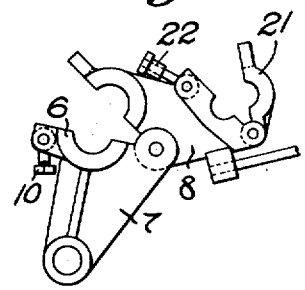
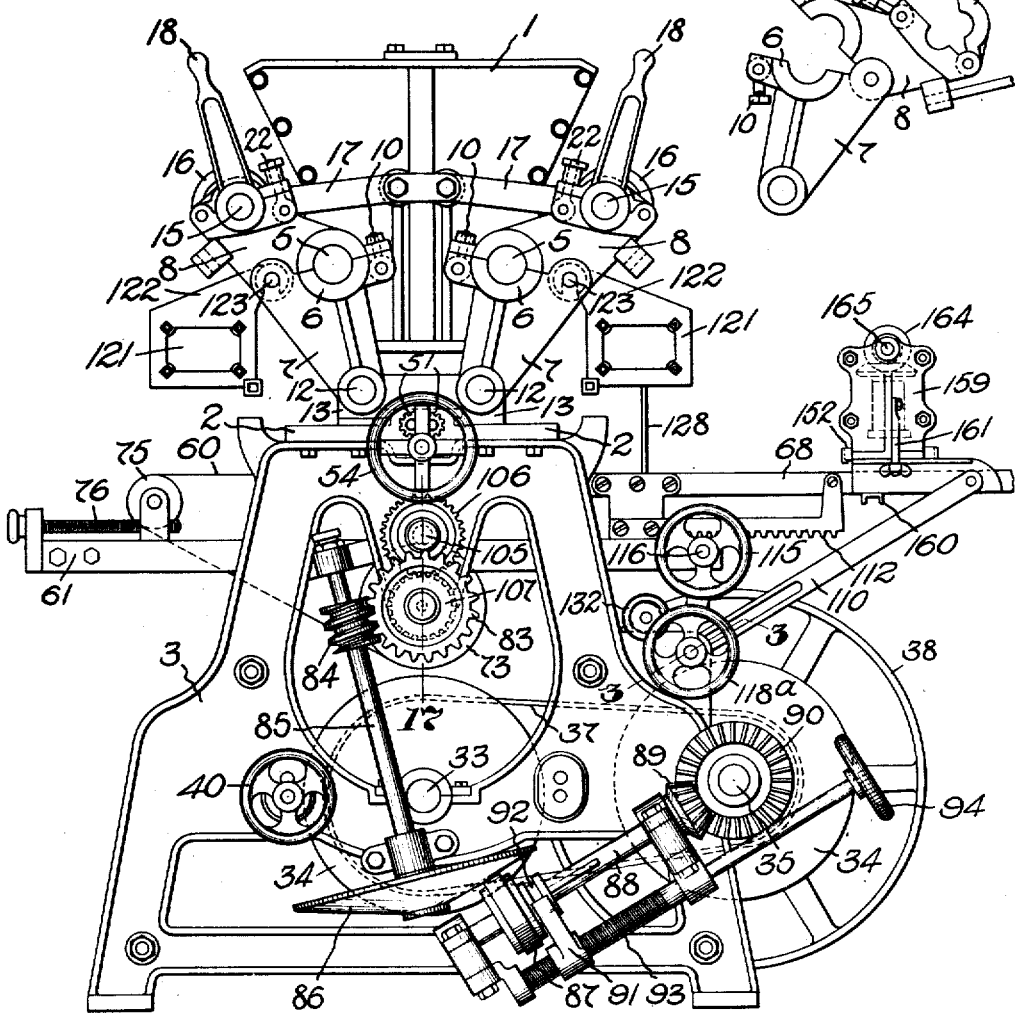
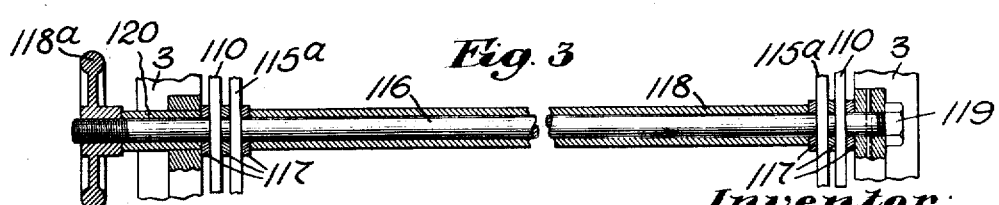
Witnesses:
Horace H. Crossman
Robert H. Kammler
Inventor:
Thomas L. Green
by Emery & Booth
attys

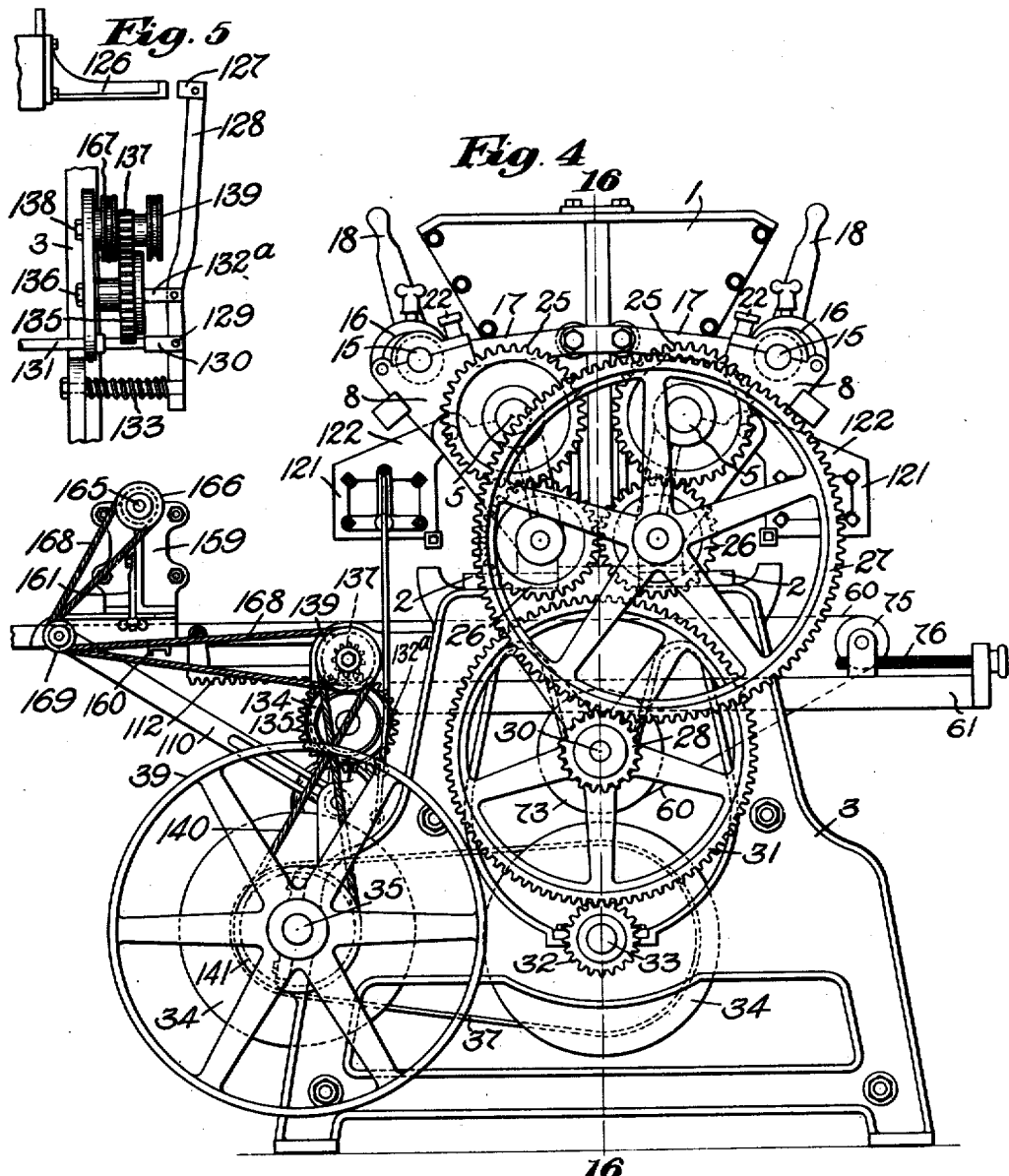

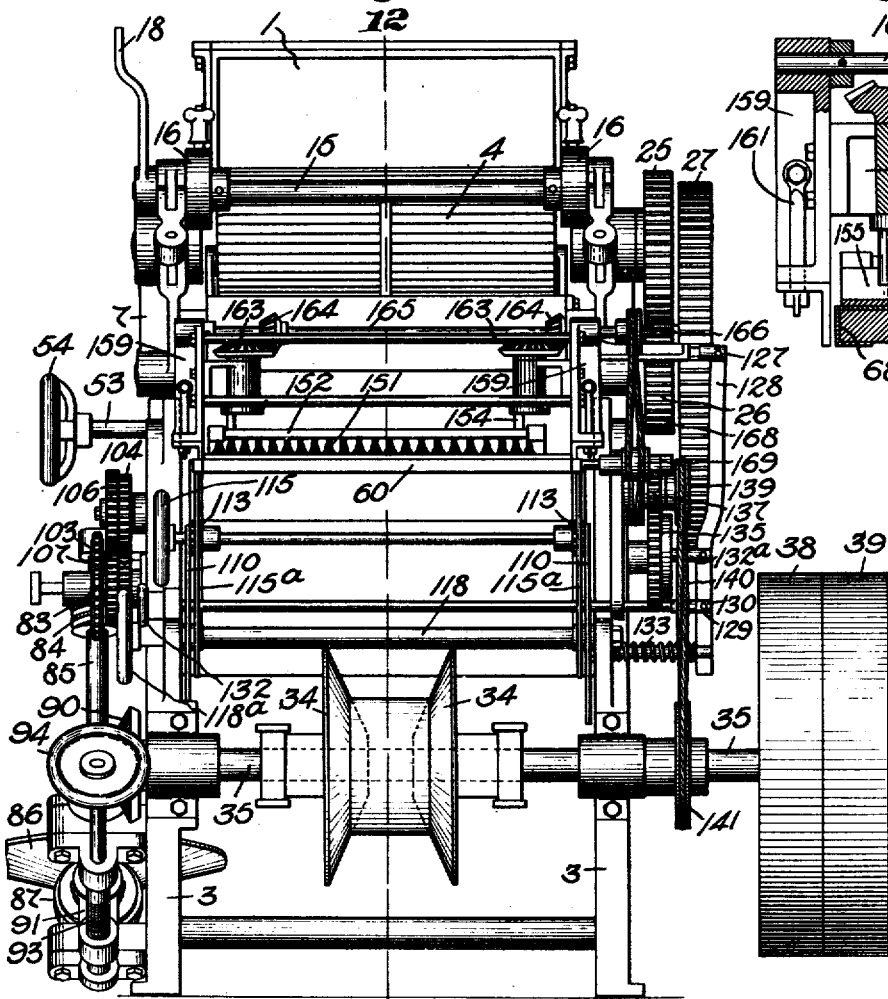
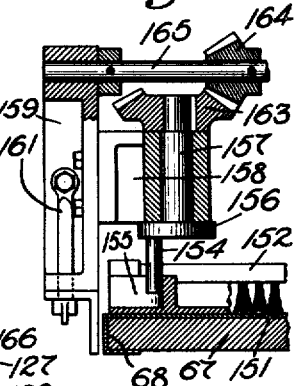
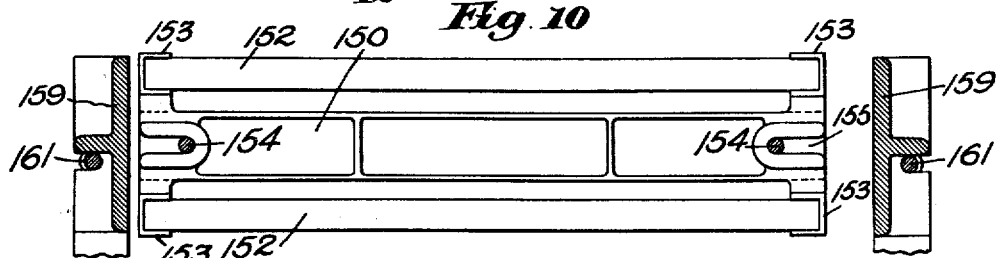

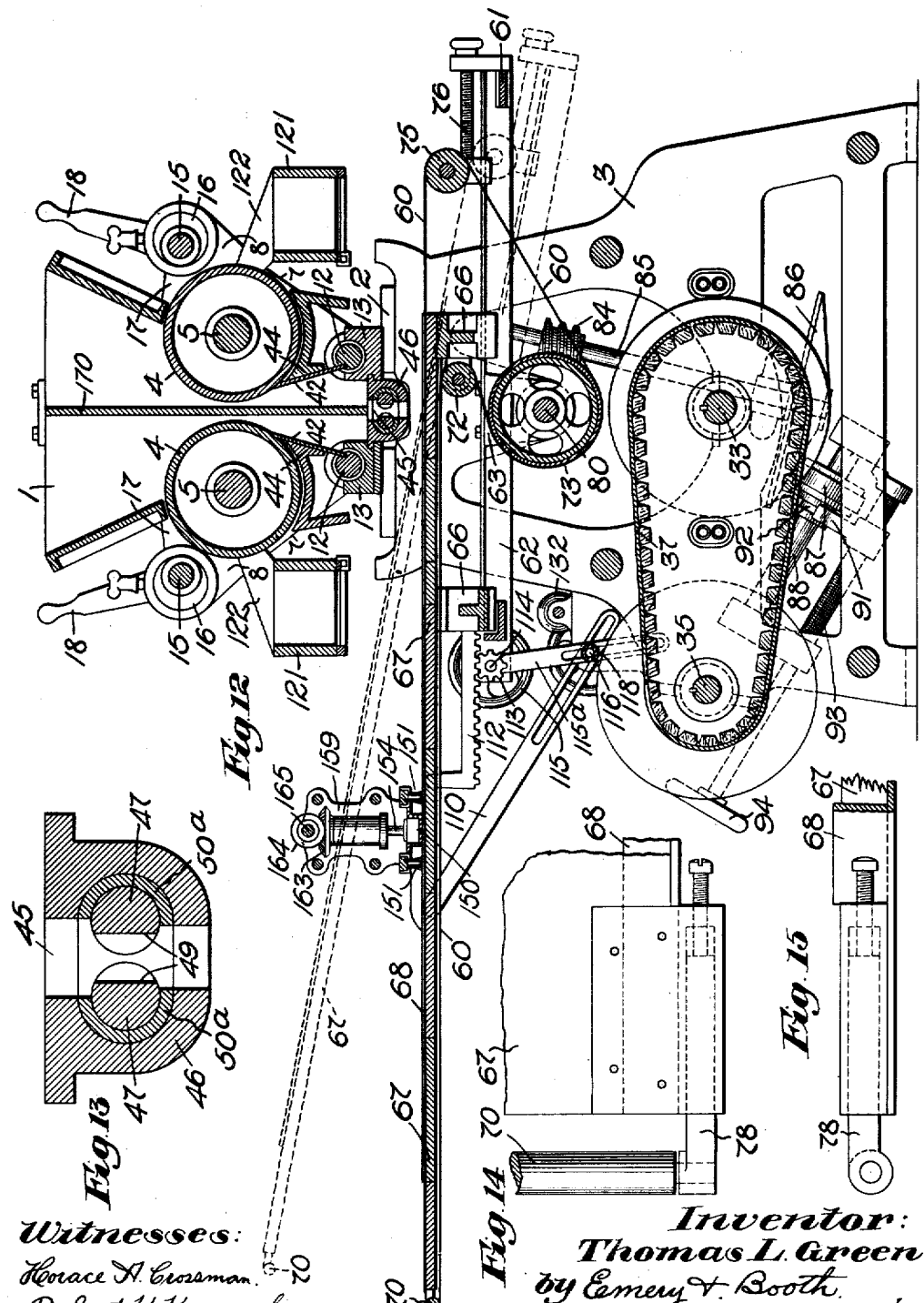

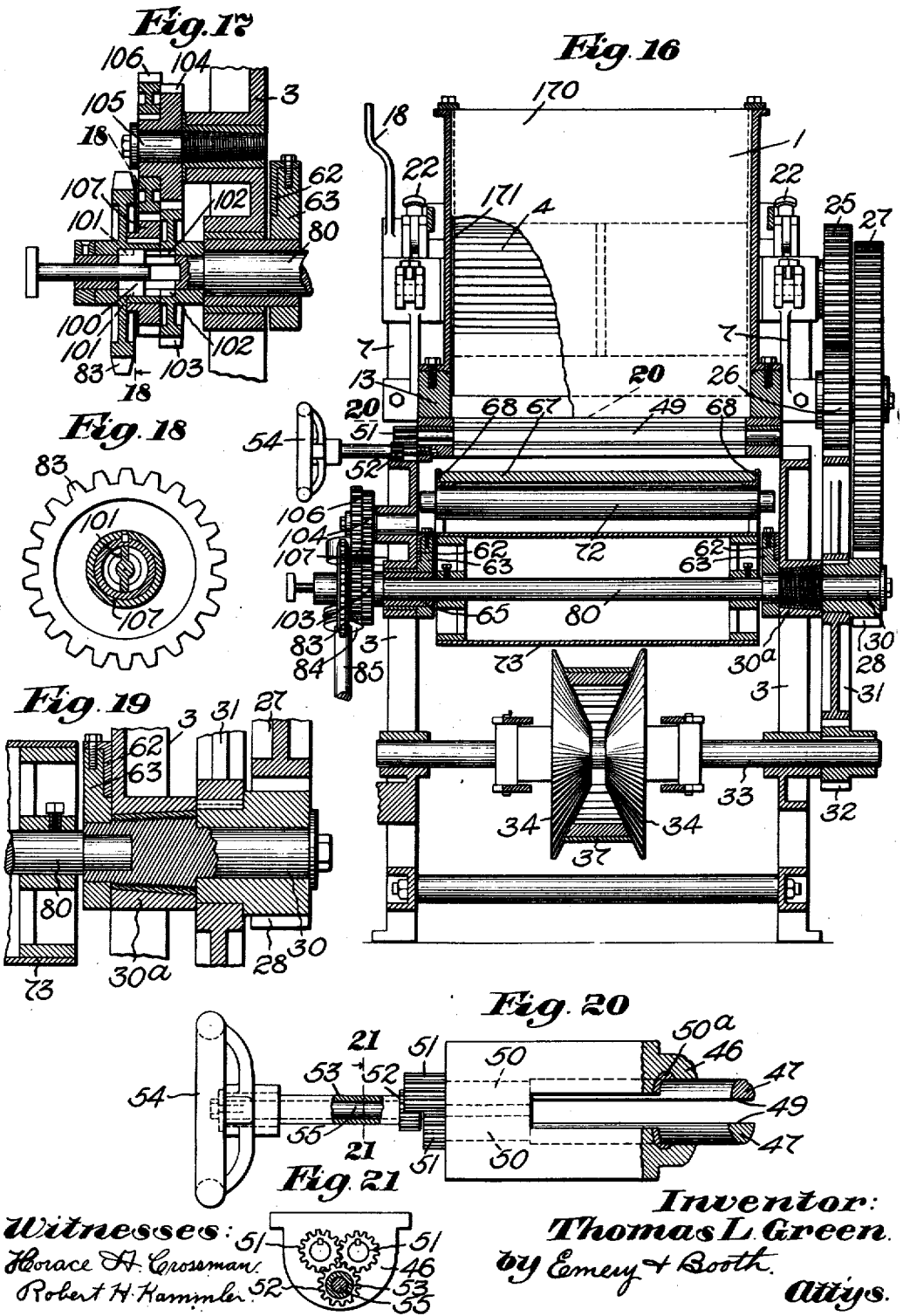

UNITED STATES PATENT OFFICE.

THOMAS L. GREEN, OF INDIANAPOLIS, INDIANA.

SHEETING AND BAR MACHINE.

1,172,521.  Specification of Letters Patent.  Patented Feb. 22, 1916.

Application filed February 20, 1909. Serial No. 479,060.

*To all whom it may concern:*

Be it known that I, THOMAS L. GREEN, a citizen of the United States, residing at Indianapolis, county of Marion, State of Indiana, have invented an Improvement in Sheeting and Bar Machines, of which the following description, in connection with the accompanying drawings, is a specification, like letters on the drawings representing like parts.

My invention relates to machines for making biscuits, and the like and more particularly to machines of the sheeter and bar type which are respectively constructed to deliver their product in sheet or parallel bar form.

My invention may be readily understood by reference to the following description of an illustrative embodiment thereof shown in the accompanying drawings wherein:

Figure 1 is a front elevation of a sheeter and bar machine embodying my invention. Fig. 2 is a view of a detail of Fig. 1. Fig. 3 is a section on the dotted line 3—3 of Fig. 1. Fig. 4 is a rear elevation of the machine shown in Fig. 1. Figs. 5, 6 and 7 are detail views of a device used in connection with the machine. Fig. 8 is a view looking toward the left of Fig. 1. Figs. 9, 10 and 11 are details of an attachment used in connection with the machine. Fig. 12 is a section taken on the dotted line 12—12 of Fig. 8. Fig. 13 is an enlarged sectional detail of a die used in the machine. Fig. 14 is an enlarged plan of an adjustment. Fig. 15 is a front view of Fig. 14. Fig. 16 is a sectional view taken on the dotted line 16—16 of Fig. 4. Fig. 17 is an enlarged sectional detail taken on the dotted line 17 of Fig. 1. Fig. 18 is a sectional detail taken on the dotted line 18—18 of Fig. 17. Fig. 19 is an enlarged detail of a bearing used in the machine. Fig. 20 is an enlarged sectional detail taken on the dotted line 20—20 of Fig. 16; and Fig. 21 is a sectional detail taken on the dotted line 21—21 of Fig. 20 looking toward the right.

Referring to Figs. 1, 4 and 12 of the drawings the machine shown herein embodying my invention comprises a hopper 1 for receiving dough or other plastic material, the base 2 of said hopper being bolted upon suitable front and rear side frames 3.

The dough may be fed through the hopper by feed rolls 4 having journals 5 removably mounted in bearings 6 (Figs. 1 and 2) in arms 7, said bearings having caps 9 hinged thereto, which may be fastened when closed by suitably swing-locking bolts 10. Said dough feed rolls may be moved toward and from each other to gage the amount of material fed therethrough, and may be separated to facilitate their removal from their bearings in a suitable manner. Herein the said arms 7 are made fast at their lower ends to shafts 12 journaled in continuous bearings 13, whereby said arms and their rolls may be swung toward and from each other as desired. Said arms 7 may be accurately adjusted about their fulcrums by any suitable means. Herein the roll carrying arms at their upper free ends carry the transverse shafts 15 having fast thereon eccentrics 16, the straps of which are formed in the ends of the links or arms 17, which are pivotally connected to the outside of the hopper ends and said shafts are provided with handles 18 whereby they may be turned and through their eccentrics cause said roll carrying arms and the rolls therein to be adjusted toward and from each other. To permit a complete separation of said feed roll arms for the purpose of removing said feed rolls, I have herein made the bearings for the eccentric shafts 15 separable, as shown in Fig. 2, wherein they are indicated as provided with hinged caps 21 adapted to be locked in position by swing bolts 22.

The dough feed rolls are driven by spur gears 25 (Figs. 4 and 16) fast to the rear ends of the roll shafts 5, said gears being driven by intermeshing spur gears 26, loosely mounted on the projecting ends of the fulcrum shafts 12 for said roll supporting arms. Since the latter swing about the axes of said shafts 12 the roll gears 25 will always be in mesh with the gears 26, whatever the adjusted positions of said feed rolls. One of said gears 26 is made fast to a large gear 27, mounted on the same shaft therewith. This gear 27 is driven by a pinion 28 loosely mounted on a stud shaft 30 (Fig. 16) more fully hereinafter described. Keyed upon the hub of the pinion 28 is a large spur gear 31 meshing with and driven by a pinion 32 fast to a shaft 33, mounted in bearings in the side frames 3 and driven by any suitable variable speed mechanism. Herein I have shown as an example of such a mechanism the well known Reeves variable speed transmission, herein illustrated as comprising the said shaft 33, the adjustable cone disks 34 thereon, the adjacent and parallel shaft 35 journaled in the side frames 3 (see Fig. 4), the similar cone disks thereon and the connecting belt or flexible transmission member 37. This last mentioned shaft 35 constitutes herein the main or driving shaft for the machine, and is therefore provided with fast and loose pulleys 38 and 39 by which to drive the same. Referring to Fig. 1, I have shown near the lower left hand front of the machine an adjustable hand wheel 40, by which to adjust said Reeves mechanism to permit said dough feed rolls to be driven through the mechanism described at any desired rotative speed, for the purpose of delivering the dough sheet or bars at any desired rate of speed.

Referring to Fig. 12, the dough feed rolls 4 are rotated by the mechanism described in opposite directions to frictionally engage the dough in the hopper and feed it downwardly between them, the amount of material fed being regulated by moving said rolls toward and from each other as described. The dough thus fed or nipped between said rolls is crowded down into the lower portion of the hopper and is prevented from adhering to said rolls by scraper blades 42, Fig. 12, the lower edges of which rest in longitudinal grooves in the roller arm fulcrum shafts 12 referred to, the bearings 13 near said blades being cut away for the purpose. These scrapers are inclined inwardly presenting sharp edges contiguous to said feed rolls, and are held in position by back supports 44, parallel to said blades and fixed to said roll arms whereby the roll carrying arms, the rolls and scraper blades move as a unit during adjustment. The dough forced down into the chamber formed between said scraper blades is then passed through a die 45 (Figs. 12, 13 and 20). This die is mounted in a die base 46 removably attached in said hopper base 2.

Heretofore so far as I am aware machines of this type have been provided with a plurality of dies, one to replace another when sheets of dough of different thickness are desired. Herein sheets of varying thickness may be formed by the use of a single die (see Figs. 12 and 13) comprising two adjustable cylinder die members 47 slabbed off longitudinally at their adjacent sides to present opposite flat faces 49. The die members are journaled in bearings 50 and segmental seats 50ª (see Fig. 20) in said die base 46, and may be turned to vary the opening between them by intermeshing pinions 51, and one of these pinions is made wider than the other for engagement with an actuating pinion 52 on a sleeve 53 of an adjustable hand wheel 54 loosely mounted on a supporting stud 55 carried by one of said side frames. Said pinion 52 with its sleeve and hand wheel are made to slide axially on their supporting stud 55 so that after the said die members have been assembled for adjustment, the same pinion 52 by which the adjustment was effected may be pushed inward to intermesh with the narrow pinion 51 which retains its engagement with the wider and intermeshing pinion, thereby locking all three pinions against rotation and maintaining the adjustment of the die members against any possibility of change.

It will be apparent that the largest die opening will be obtained when the flat faces of said cylinders are in parallel vertical planes, as shown in Fig. 13. If the die members are turned to converge said faces downwardly toward each other, the lower edges thereof will approach, presenting a die opening which is wedge shaped in section, the narrowest opening occurring when said members are turned sufficiently to cause said flat faces to lie in the same horizontal plane. The described construction presents an adjustable die capable of adjustment, even while the machine is in motion to vary the thickness of sheet, produced to any desired degree, and without interruption of the operation of the machine, and presents at all times and in any position of adjustment continuous smooth surfaces which insure best condition and delivery of dough. By desired assembling of the die rolls, the angle at which the dough issues from the die may be changed at will. The described die may also be readily opened or enlarged to free it of any foreign substance that may have found lodgment therein or for any other purpose desired.

With the die shown the dough or other plastic material issues therefrom in the form of a sheet, and is fed on to a continuous traveling apron 60 (see Fig. 12), mounted on a tilted carrier frame 61. This frame comprises front and rear angle bar members or guides 62, provided with depending brackets 63, one of which, namely that at the right of Fig. 16, is pivoted on the inwardly projected end of the above referred to stud 30, the other said bracket being pivoted on a sleeve 65, on the opposite side of said frame. Mounted to slide on the guide bars 62 (see Fig. 12) are the transverse apron board supports, 66, which in turn support the apron board 67, comprising transverse members carried by and between the longitudinal angle bars 68 shown best in Fig. 16. The apron 30 hereinbefore referred to is mounted to travel over and upon said apron board (see Fig. 12), and at the left hand end of said board passes about a roller 70, returning along the under side of said apron board to a return roller 72 journaled in bearings on and movable with the right hand transverse supporting bar 66

(see Fig. 12), thence down and about the apron driving drum 73, thence to and about the take-up roller 75, adjustably mounted on a projecting end of the tilting frame 61, on which it is adjusted by suitable independently operable adjusting devices 76. If one edge portion of the apron should travel more tightly than the other, this irregularity may be compensated for by independently adjusting either one of the said adjusting devices 76, or by independently adjusting the arms 78 (see Figs. 14 and 15) supporting the roller 70 at the opposite end of the apron board.

The apron drive drum 73 may be driven by any suitable variable speed mechanism. Herein said drum is mounted fast on a drum shaft 80 (see Fig. 16) one end of which is journaled in a recessed bearing in the inner end of the stud shaft 30 referred to. The opposite end of said shaft being extended through the sleeve 65 about which one of said apron frame brackets is pivoted as described. The stud 30 (Figs. 16 and 19) constitutes not only a bearing for one end of said apron drum shaft, but also a bearing for the pinion 28, and one of said apron board pivot brackets. An intermediate portion of this stud is conical in form, and is not threaded directly into the corresponding cone bore in the boss 30ª in the frame, but herein said boss is bored larger than said cone, the latter being babbitted into said boss bore, furnishing a strong construction, easy to make and assemble, without the necessity of threading said cone bore.

Referring again to the apron drum shaft 80, the latter projects outwardly toward the front of the machine (see Figs. 1 and 17) and is driven by a worm wheel 83, which meshes with a worm 84 fast to the upper end of the inclined worm shaft 85, which is located outside the frame in suitable bearings therein. A friction cone 86 is mounted fast to the lower end of said inclined shaft, and is adapted to receive a variety of speeds from a friction wheel 87 (see Fig. 1) engaging and adjustable along the face thereof. This friction drive wheel is splined to an inclined shaft 88 journaled in bearings also upon the outside of the frame. This friction wheel shaft is driven by a bevel gear 89 fast to the upper end of its shaft, in turn driven by a bevel gear 90 fast on the main shaft 35 heretofore referred to. Said friction wheel 87 may be moved along the face of said driven friction disk 86 to vary the speed transmitted to the latter by a fork 91 engaging a peripheral groove 92 on the hub of said friction wheel, said fork being adjusted by a screw shaft 93 adjacent and parallel to said friction wheel shaft 88, and controlled by a suitable hand wheel 94. Referring to Figs. 16 and 17, the worm gear referred to for driving the apron drum shaft 80 may be connected directly to said shaft for driving said drum at one speed or indirectly through a train of gears for driving it at a different speed. As shown in said figures, said worm gear may be directly connected to said apron drum shaft by a double key 100 mounted to slide axially in the end of said drum shaft 80, and adapted when in its extreme outermost position to enter keyways 101 in the hub of said worm wheel, thereby to cause said worm wheel and shaft when connected to rotate as one. When said key is pushed inward to its extreme innermost position, it enters keyways 102 in the hub of a spur gear 103, loosely mounted on said drum shaft. This gear meshes with and drives a spur gear 104 directly above it, and loosely mounted on a stud 105 on said frame. Fast upon the hub of the gear 104 is a second gear 106, which drives back into a smaller gear 107, fast upon the hub of said worm wheel 83. When driven through these gears the apron drum 73 will turn at a lower speed than when driven directly from said worm gear 83. When the key 100 is in mid position both the gear 103 and the worm wheel 83 are disconnected from the drum shaft, in which case the latter remains at rest, said key then standing stationarily in the counter bored hub of said worm wheel, which turns idly about it. Thus is provided means for driving the dough carrier or apron 60 at a wide range of speed, and with all the fineness of gradation of speed made possible by the friction drive at the bottom of the worm shaft 85.

The sheet or series of bars being delivered upon the carrier are carried forward by the latter, and delivered to a cutting or other machine next to it or for any other purpose desired. Since the receiving ends of such other machine or machines may vary considerably in height from the floor, it is desirable to vary the height of the delivery end of the carrier, and I have herein provided for this by the tilting carrying frame 61. To this end the apron board angle boards are provided with supports 110 (see Fig. 12) pivoted at their outer and upper ends to said angle bars 68, and slotted at their lower ends to receive a clamping device hereinafter described. It is obvious that by slackening these clamping bolts the slotted supports 110 may be adjusted to tip the carrier frame and its board and the apron into any desired angular positions, such, for instance, as indicated in dotted lines in Fig. 12, making it possible for the carrier to deliver at any desired angle for any purpose whatsoever. It is also desirable to provide means for varying the longitudinal position of the delivery carrier or apron in addition to varying its level to facilitate the positioning and the setting up of the machine relative to any companion or other machine. To accomplish this, the transverse board supports 66 on the side members of the swinging frame 61 may be slid along the board supporting angle bars by means of depending racks 112, Figs. 1 and 12, which, together with the apron board 67, may be moved forward or backward by the pinions 113 fast to a shaft 114, journaled in bearings in the front ends of said guide bars 62 of the apron board frame, said shaft being rotated by a suitable hand wheel 115 (see Fig. 1) at one end thereof. The apron board and its frame 62 are provided with additional supports 115$^a$ (see Fig. 12) depending from said pinion shaft 114, said supports being held in their adjusted positions by the same clamping device which locks said arms 110. This locking device (see Figs. 3 and 12) comprises a clamping rod 116, mounted in said frames 3, said rod passing through the slots in the supports 110 and 115$^a$ referred to. Said supports are separated by washers 117, the inner washers contacting with the opposite ends of a long sleeve 118 on said rod 116. A hand wheel 118$^a$ is threaded upon the end of said rod, the opposite end of the latter receiving a nut 119 engaging the outer face of one of the frames 3. Between the hand wheel and the innermost washer is a short sleeve 120, so that when the hand wheel is turned the sleeves and intervening washers are brought tightly together to clamp all of the said supports 110 and 115 simultaneously, constituting a simple and efficient clamping device permitting of ready adjustment of the carrier.

Referring more particularly to Figs 4, 5, 6 and 7, flour boxes 121 may be attached on each side of said hopper to the dough feed roll arms 7 by arms 122 hooked over studs 123 on said roll arms, said boxes having suitable sieves, adapted to sift flour upon the sheet of dough fed beneath the same. These flour boxes may be vibrated or agitated in any suitable manner, as, for instance, by the mechanism shown in connection with one of said boxes at the left of the hopper in Fig. 4. The rear end of said box is provided with a bracket 126 (see Fig. 5) adapted to be struck intermittently by a hammer 127, the handle, 128, of which is fulcrumed between its ends on a pin 129 (see Fig. 7) in a forked head 130. This head 130 is fast upon the end of a rod 131, which is mounted to slide in said frames 3 and restrained from rotative movement thereon, but may be moved longitudinally by the hand wheel 132 (see Figs. 1 and 7) threaded upon one end of said rod for the purpose of adjusting the position of the hammer fulcrum at any time. Said hammer is provided with a follower 132$^a$ (see Fig. 5) pressed by a spring 133 on the end of said hammer into engagement with an annular cam groove 134, (see Fig. 6) on the face of a spur gear 135 rotative on a stud 136 fixed in one of said frames 3. Said groove is provided with a ratchet tooth bottom whereby said hammer has imparted to it a rapid succession of hammer blows. The cam faced gear 135 meshes with a pinion 137 on a stud 138 on said frame, a sheave 139 being fixed to said pinion to rotate therewith. Said sheave is driven by a round belt 140 (see Figs. 4 and 8) from a sheave 141 fast to the main drive shaft 35.

A suitable surface may be given the sheet of material fed by the carrier by a polishing plate 150 (see Figs. 4, 8, 9, 10 and 11) which may be of any suitable form, but is herein shown as U-shaped in section to prevent any roughening or mutilation of the sheet acted upon. In conjunction with this plate one or more surfacing or flour distributing brushes 151 may be used. Herein a brush is shown on each side of said plate, said brushes and plate being all carried by a back or support 152. The plate and brushes are supported entirely by the sheet of material fed, but the brushes being lighter than said plate may be mounted to rest on said sheet independently of said plate, said brushes being carried in suitable guides 153 in said support for this purpose. This support, 152, may be given an oscillatory or gyratory movement in a horizontal plane by crank pins 154, engaging slots 155 on the back of said support. Said pins depend from disks 156 (see Fig. 9) on the lower ends of vertical shafts 157, journaled in arms 158, extending laterally from front and rear brackets 159. These brackets are pivoted on the outside of the apron board angle bars 68, said brackets being supported in place when tipped down into position by a transverse bar 160 (see Fig. 1) connected to said angle bars, and may be held in position by locking bolts 161. The brackets may be tipped backward on their pivots to raise said polishing devices when desired as when starting a new or broken sheet and by loosening said locking bolts said polishing devices may be removed. The brush and plate actuating shafts 157 may be driven by beveled gears 163 fast to the upper ends thereof, said gears meshing with beveled gears 164 fast on the shaft 165 journaled in bearings in the upper ends of said brackets. The shaft 165 projects outwardly to receive a sheave 166, (see Figs. 4 and 8) which may be driven from a sheave 167 fast to said hammer pinion 137, on the stud 138, (see Fig. 5), said sheaves 166, and 167 being connected by a round belt 168 guided over idler sheaves 169 on the pivot pin of one of said brackets.

When two different doughs are used for layer, filled or stripe work and the like a division plate 170 (see Figs. 12 and 16) may be introduced into said hopper between said feed rolls. Said plate when inserted is guided by vertical grooves 171 in the interiors of the ends of said hopper and rests upon the ends of said die base 46.

In the use of the machine described the dough is fed into the hopper 1, a large or small amount of dough being fed therethrough according to the relative positions of the dough feed rolls 4, and their speed of rotation which may be adjusted by the Reeves variable speed transmission. These rolls are continuously driven and may be swung into any position of adjustment without affecting their drive. The dough is nipped by said rolls 4 as they rotate toward each other and is fed down into the chamber beneath the same, the dough being then forced through the die 45 in a homogeneous sheet. The thickness of this sheet may be regulated by turning the flat faced die cylinders 47 simultaneously by the hand wheel 57 until the desired die opening is obtained, said wheel being then pushed in to cause the die adjusting pinion 52 to mesh with both of said cylinder pinions 51, thereby securely locking the same in their adjusted positions as described. It will be apparent that by adjusting said dough feed rolls and said die, sheets of material of great variety of consistency and form may be died out without the removal or replacement of any parts. If layer work is desired the division plate 170 is inserted between the feed rolls 4 and two different doughs may then be fed to said die. This machine may not only be used to produce sheet work, but also bar work may be readily produced by simply removing said sheeting die and inserting a bar die of usual construction not shown here. The dough thus shaped by said adjustable die 45 is fed on to the continuously traveling apron 60, and the dough sheet fed along thereby may be delivered to any suitable cutting machine for cutting out cakes from said sheet as desired. To this end the apron carriage 61 may be tilted to the proper inclination to conform to the cutting machine and may be adjusted longitudinally further to properly position said apron with respect to said machine. When properly adjusted the apron carriage may be locked in place by its clamping device.

The die opening may be adjusted also to supply a sheet of greater or less thickness according to the angle to which the carrier is tilted. If the carrier were inclined downwardly toward its delivery end the direction of travel of the dough sheet issuing from the die would be changed from a right to an obtuse angle, whereas if tilted up its direction would be changed to an acute angle, and if the dough sheet were thick this sharp acute bend by compressing the top surface and stretching the lower surface of the sheet would destroy more or less the smooth surface imparted by said die, an action, however, which would be less effective on thinner sheets.

The two speeds transmitted to the feed apron drum by the direct and indirect connection of the worm wheel 83 to the apron drum shaft 80 may be varied to give a wide range of speed with a nicety of speed gradation by adjusting the drive friction wheel along the face of the driven friction disk.

The dough sheet passes under the flour box 121, the latter being given the desired degree of blow by the adjustable hammer 127 to shake a large or small amount of flour on the sheet passing therebeneath. The dough sheet then passes beneath the surfacing brushes and plate, which are supported on said sheet and receive a gyratory or oscillatory movement simultaneously.

By my invention all of the principal adjustments may be made while the machine is in motion, the machine being simple in construction, readily accessible and easy to operate. By my invention also a machine is provided having a capacity for producing a great variety of product with few and simple adjustments.

It will be understood that my invention is applicable to machines of the class for treating plastic material and is not limited to the particular embodiment shown herein, but that various modifications may be made without departing from the spirit of my invention.

Claims:

1. In a machine of the class described, the combination of a hopper, a die base, and a forming die comprising a plurality of normally stationary walls mounted in said base and angularly adjustable relatively to one another to different fixed positions to vary the space between them.

2. In a machine of the class described, the combination of a hopper, a die base, a forming die having opposed normally stationary adjustable die members mounted in said base and means to vary the angle and space between said members.

3. In a machine of the class described, the combination of a hopper, a die base having bearings therein, a delivery die therefor having opposed rotative die members fitting said bearings and means to turn one of said members for purposes of adjustment.

4. In a machine of the class described, the combination of a hopper, a die base, a forming die therefor having opposed die members seated in said base, means to turn the members to vary the distance between the two, and locking means to retain said members in position.

5. In a machine of the class described, the combination of a hopper, a forming die therefor, flat faced die cylinders journaled therein, segmental seats for the cylindrical surfaces thereof, and means to turn said cylinders to vary the opening between their flat faces.

6. In a machine of the class described, the combination of a hopper, a forming die therefor, die members having shafts journaled therein, pinions on said shafts and a pinion adapted to mesh with one or both of said pinions to adjust and lock the same.

7. In a machine of the class described, the combination of a hopper, adjustable dough feeding means therein and an outlet die therefor having a plurality of angularly and relatively adjustable die walls, and through which the dough is forced by said feeding means.

8. In a machine of the class described, the combination of a hopper, an adjustable forming die therefor, adjustable dough feeding means and a partition above said die coöperating with the latter.

9. In a machine of the class described, the combination of a hopper, an adjustable die therefor, a partition above said die and coöperating with the latter and adjustable feeding means at each side of said partition for feeding plastic material through said die.

10. In a machine of the class described, the combination of a hopper having fixed walls, a partition in said hopper, feed rolls both adjustable relatively to said walls for variably feeding plastic material, scrapers engaging each roll, and means to swing each roll and its scraper as a unit to different positions of fixed adjustment without loss of engagement between said rolls and scrapers.

11. In a machine of the class described, the combination of a hopper having fixed walls, a partition in said hopper, opposed feed rolls adjustable relatively to said walls for variably feeding plastic material, swinging supports for the feed rolls, scrapers engaging said rolls, and means to adjust the latter respectively and their scrapers to positions of fixed adjustment without loss of engagement between them.

12. In a machine of the class described, the combination of a support with forming means thereon, an apron, guide rolls therefor, a frame supporting said rolls and apron, and means adjustably connecting said frame with said support having provision for tilting or longitudinally shifting said apron, rolls and frame as a unit relatively to said forming means to different positions.

13. In a machine of the class described, the combination of feeding means, a train of driving gears therefor, a traveling carrier for receiving material from said feeding means, a carrier feeding drum having journals at its ends, a stationary stud constituting a bearing for one of said journals and forming the bearing for one of the gears in said train.

In testimony whereof, I have signed my name to this specification, in the presence of two subscribing witnesses.

THOMAS L. GREEN.

Witnesses:
FREDERICK L. EMERY,
WM. A. OREN.

It is hereby certified that in Letters Patent No. 1,172,521, granted February 22, 1916, upon the application of Thomas L. Green, of Indianapolis, Indiana, for an improvement in "Sheeting and Bar Machines," an error appears in the printed specification requiring correction as follows: Page 6, line 33, claim 10, for the words "each roll" read *said rolls;* and that the said Letters Patent should be read with this correction therein that the same may conform to the record of the case in the Patent Office.

Signed and sealed this 18th day of April, A. D., 1916.

[SEAL.]
R. F. WHITEHEAD,
*Acting Commissioner of Patents.*

Cl. 107—12.